US008636289B2

(12) United States Patent
Skijus et al.

(10) Patent No.: US 8,636,289 B2
(45) Date of Patent: Jan. 28, 2014

(54) STRAW TRAPPER FOR WHEELBARROW

(76) Inventors: John Skijus, Franklin Square, NY (US); Thomas Berinato, Lynbrook, NY (US)

( * ) Notice: Subject to any disclaimer, the term of this patent is extended or adjusted under 35 U.S.C. 154(b) by 150 days.

(21) Appl. No.: 13/317,336

(22) Filed: Oct. 14, 2011

(65) Prior Publication Data
US 2012/0181761 A1 Jul. 19, 2012

(51) Int. Cl.
*B62B 1/20* (2006.01)
*B62B 5/06* (2006.01)

(52) U.S. Cl.
CPC ........................... *B62B 1/20* (2013.01)
USPC ........................................ 280/47.31

(58) Field of Classification Search
CPC .................... B62B 5/06; B62B 1/20
USPC ............. 280/47.31; 16/110.1, 406, 408, 409, 16/422, 426
See application file for complete search history.

(56) References Cited

U.S. PATENT DOCUMENTS

| | | | | |
|---|---|---|---|---|
| 591,547 | A | * | 10/1897 | O'Neill .......................... 16/409 |
| 1,325,557 | A | | 12/1919 | Cummins |
| 1,513,469 | A | | 10/1924 | Robinson |
| 1,553,297 | A | * | 9/1925 | Place ............................. 16/406 |
| 1,808,890 | A | * | 6/1931 | Grant ............................ 16/406 |
| 1,815,244 | A | | 7/1931 | Dodge |
| 2,350,062 | A | | 5/1944 | Mosier |
| 2,422,331 | A | * | 6/1947 | Bates ............................ 280/42 |
| 2,494,144 | A | | 1/1950 | Restall |
| 2,553,334 | A | | 5/1951 | Schmidt |
| 2,598,682 | A | * | 6/1952 | Giovannoni ................... 280/14 |
| 2,624,431 | A | * | 1/1953 | Caro ............................. 16/408 |
| 2,872,202 | A | | 2/1959 | Tripoli |
| 2,902,286 | A | | 9/1959 | Wood, Jr. |
| 2,938,748 | A | | 5/1960 | Johnson |
| 2,979,338 | A | * | 4/1961 | Dwyer ....................... 280/47.3 |
| 3,045,847 | A | * | 7/1962 | Fisher .......................... 414/444 |
| 3,161,434 | A | * | 12/1964 | Jerpbak ........................ 296/36 |
| 3,188,109 | A | | 6/1965 | Broadrick |
| 3,236,537 | A | | 2/1966 | Eckman |
| 3,463,504 | A | | 8/1969 | Petry et al. |
| 3,679,227 | A | | 7/1972 | Rock |
| 3,751,058 | A | | 8/1973 | Larsen |
| 3,820,807 | A | * | 6/1974 | Curran ....................... 280/47.3 |
| 3,870,367 | A | * | 3/1975 | O'Brien ....................... 298/1 B |
| 3,894,753 | A | | 7/1975 | Ickes |

(Continued)

FOREIGN PATENT DOCUMENTS

| | | | | |
|---|---|---|---|---|
| DE | 3836881 | C1 * | 8/1989 | ............... B62B 1/20 |
| GB | 2135249 | A * | 8/1984 | ............... B62B 1/20 |

(Continued)

*Primary Examiner* — Hau Phan
*Assistant Examiner* — Jacob Meyer
(74) *Attorney, Agent, or Firm* — Alfred M. Walker

(57) ABSTRACT

A wheelbarrow includes a straw trapper for enclosing straw and debris in a bin of the wheelbarrow for shipment and storage. The straw trapper includes a dispenser of a panel of fabric or flexible plastic to cover the open top of the wheelbarrow bin. The dispenser is mounted on a first side wall of the wheelbarrow bin and includes an engagement member assembly mounted on a second, opposite side wall of the wheelbarrow which engages a free end of the panel. Fixed and adjustable handles mounted on both rear and front walls of the wheelbarrow bin to allow two users working together to unload straw from the bin over a side wall of the bin into a debris collection receptacle, such as a dumpster or compost container.

11 Claims, 4 Drawing Sheets

(56) References Cited

U.S. PATENT DOCUMENTS

| | | | |
|---|---|---|---|
| 3,913,762 A | 10/1975 | Alexander | |
| 3,936,070 A | 2/1976 | Owings | |
| 3,977,477 A * | 8/1976 | Wise | 172/246 |
| 4,055,354 A * | 10/1977 | Sharpe | 280/47.31 |
| 4,190,260 A * | 2/1980 | Pearce | 280/47.31 |
| 4,194,654 A | 3/1980 | Badger | |
| 4,199,161 A | 4/1980 | Nieminen et al. | |
| 4,223,907 A * | 9/1980 | Kelly | 280/408 |
| 4,253,677 A | 3/1981 | Wissler | |
| 4,261,596 A | 4/1981 | Douglas | |
| 4,266,791 A | 5/1981 | Myers | |
| 4,274,649 A | 6/1981 | Vanderhorst et al. | |
| 4,316,615 A * | 2/1982 | Willette | 280/47.26 |
| 4,375,113 A | 3/1983 | Ewert | |
| 4,645,225 A | 2/1987 | Eubanks | |
| 4,663,802 A * | 5/1987 | Kunzler | 16/408 |
| 4,758,010 A * | 7/1988 | Christie | 280/47.31 |
| 4,783,090 A | 11/1988 | Moulton | |
| 4,789,171 A | 12/1988 | Porter | |
| 4,789,180 A | 12/1988 | Bell | |
| 4,825,505 A | 5/1989 | Witte | |
| 4,846,427 A | 7/1989 | Jones | |
| 4,873,841 A | 10/1989 | Bradshaw et al. | |
| 4,889,360 A | 12/1989 | Havlovitz | |
| 4,957,306 A | 9/1990 | Greenberg | |
| 4,958,846 A | 9/1990 | Greenberg | |
| 5,040,807 A * | 8/1991 | Snover | 280/30 |
| D321,966 S * | 11/1991 | Fuller | D34/27 |
| 5,067,737 A * | 11/1991 | Broeske | 280/47.31 |
| 5,106,113 A * | 4/1992 | Piacentini | 280/47.21 |
| 5,116,289 A | 5/1992 | Pond et al. | |
| 5,149,116 A | 9/1992 | Donze et al. | |
| 5,163,694 A | 11/1992 | Reichek | |
| 5,263,727 A | 11/1993 | Libit et al. | |
| 5,277,449 A | 1/1994 | Schmidt | |
| 5,290,055 A | 3/1994 | Treat, Jr. | |
| 5,318,315 A | 6/1994 | White et al. | |
| 5,330,212 A | 7/1994 | Gardner | |
| D351,700 S | 10/1994 | Uzelman | |
| 5,374,095 A * | 12/1994 | Ramseth | 296/32 |
| D362,100 S | 9/1995 | McMurdo | |
| 5,461,755 A * | 10/1995 | Hardigg et al. | 16/438 |
| 5,620,193 A * | 4/1997 | Dschaak | 280/47.31 |
| 5,687,979 A * | 11/1997 | Plevka | 280/47.19 |
| 5,692,761 A | 12/1997 | Havlovitz | |
| 5,772,370 A * | 6/1998 | Moore | 410/100 |
| 5,803,391 A * | 9/1998 | Saperstein et al. | 242/395 |
| 5,803,472 A | 9/1998 | Lien | |
| 5,806,866 A * | 9/1998 | Fleischer | 280/47.31 |
| 5,820,141 A | 10/1998 | Wilkerson et al. | |
| 5,839,772 A * | 11/1998 | Toole | 296/32 |
| 5,884,924 A * | 3/1999 | Fairchild et al. | 280/47.31 |
| 5,909,758 A * | 6/1999 | Kitamura | 16/406 |
| 5,957,352 A * | 9/1999 | Gares | 224/401 |
| 6,098,492 A | 8/2000 | Juchniewicz et al. | |
| 6,099,222 A * | 8/2000 | Moore | 410/100 |
| 6,139,029 A | 10/2000 | Shaw | |
| 6,193,265 B1 * | 2/2001 | Yemini | 280/653 |
| 6,213,482 B1 * | 4/2001 | Yemini | 280/47.26 |
| 6,213,532 B1 * | 4/2001 | Dunyon | 296/32 |
| 6,397,435 B1 * | 6/2002 | Gosselet | 16/438 |
| 6,488,325 B1 * | 12/2002 | Ehrenberger et al. | 296/37.16 |
| 6,499,193 B1 | 12/2002 | Robert | |
| 6,547,309 B1 * | 4/2003 | Franklin et al. | 296/98 |
| 6,550,104 B2 * | 4/2003 | Cacciacarne | 16/426 |
| 6,554,301 B2 * | 4/2003 | Scott et al. | 280/47.31 |
| 6,561,529 B2 | 5/2003 | Darling, III | |
| 6,643,897 B2 * | 11/2003 | Chang | 16/248 |
| 6,880,852 B2 * | 4/2005 | Lim | 280/653 |
| 6,964,421 B2 * | 11/2005 | Friel | 280/47.31 |
| 7,571,517 B2 | 8/2009 | Smith et al. | |
| 7,641,204 B2 | 1/2010 | Rye et al. | |
| 7,775,530 B2 * | 8/2010 | Darling, III | 280/47.18 |
| 7,815,215 B1 * | 10/2010 | Lowe | 280/639 |
| 7,850,176 B2 | 12/2010 | Hill | |
| 7,866,686 B2 | 1/2011 | Conaway et al. | |
| 7,900,939 B2 * | 3/2011 | Robinson | 280/47.31 |
| 8,366,125 B2 * | 2/2013 | Loomans | 280/47.17 |
| 8,376,377 B2 * | 2/2013 | Weston | 280/87.021 |
| 2001/0047569 A1 | 12/2001 | Cacciacarne | 16/426 |
| 2003/0011154 A1 * | 1/2003 | Scott et al. | 280/47.31 |
| 2004/0041361 A1 * | 3/2004 | Lim | 280/47.31 |
| 2004/0084864 A1 * | 5/2004 | Casey et al. | 280/47.31 |
| 2005/0062245 A1 | 3/2005 | Tomchak et al. | |
| 2006/0103088 A1 * | 5/2006 | Robinson | 280/47.31 |
| 2007/0052187 A1 * | 3/2007 | Browder | 280/47.31 |
| 2007/0096414 A1 * | 5/2007 | Beaudoin | 280/47.31 |
| 2007/0114765 A1 | 5/2007 | Leger et al. | |
| 2007/0296166 A1 * | 12/2007 | Robinson | 280/47.31 |
| 2008/0079228 A1 * | 4/2008 | Rye et al. | 280/47.31 |
| 2010/0201091 A1 * | 8/2010 | Easterling | 280/47.31 |
| 2010/0270764 A1 * | 10/2010 | Odle et al. | 280/47.19 |
| 2011/0260420 A1 * | 10/2011 | Volin | 280/47.31 |
| 2012/0049473 A1 * | 3/2012 | Robinson | 280/47.31 |
| 2012/0126502 A1 * | 5/2012 | Robinson | 280/47.31 |

FOREIGN PATENT DOCUMENTS

| | | | |
|---|---|---|---|
| GB | 2241204 A * | 8/1991 | B62B 1/20 |
| WO | WO 9429157 A1 * | 12/1994 | B62B 1/20 |
| WO | PCT/US2011/001958 | 12/2011 | |

* cited by examiner

STRAW TRAPPER FOR WHEELBARROW

FIELD OF THE INVENTION

The present invention relates to dual handled liftable wheelbarrows.

BACKGROUND OF THE INVENTION

Carts and wheelbarrows are well represented in the prior art. Some carts are general purpose, while others are designed for a specific use. Wheelbarrows are used commonly both on the farm as well as the construction site. A stable for the use of horses requires frequent cleaning and moving of used straw from the stalls to a dumping area which can be a dumpster with high sides. Carts with two wheels and a deep bin are often used. Wheelbarrows with one wheel are also used at times for the same purpose to move the used straw. Since the carts and wheelbarrows for stall cleaning service must be emptied in an efficient manner, an auxiliary handle mounted to the bin portion opposite the primary handle or handles is an effective aid in this task. In transporting the used straw from the cleaned-out stables to the dumping area, straw at or near to the top of the cart bin is often blown or jostled off the cart trailing debris along the route.

U.S. Pat. No. 2,350,062 of Mosier shows a four wheel cart with small wheels, a low bin portion, and a front pivoted steering arrangement for the two front wheels. Besides a rod-mounted front pulling handle, a second pushing handle is mounted to the bin at the rear.

U.S. Pat. No. 4,223,907 of Kelly reveals a separable mortar cart with two attached separate deep bins and a total of six wheels. The intent is to transport a large amount of material substantially filling both bins from a supply point to a distribution point in a unitary configuration by a single worker pushing on either of the handles attached to opposite ends of the composite cart rolling on four large wheels. Upon reaching a distributing point, the cart is separated and each half is handled by one worker using two large wheels and a third smaller wheel that is now permitted to touch the ground. In this manner, the lower weight of one bin would be easily supported by scaffolding. These are heavy duty carts which are not designed for lifting in either separated or unitary configurations by the single or two handles respectively.

U.S. Pat. No. 6,139,029 of Shaw relates to a portable 2-wheeled utility cart with high handles placed at two opposite sides. Besides these high handles extending from the bin ends, a carrying handle or grip is centrally attached to the upper margin of each of the bin ends to lift the cart or to maneuver it into a motor vehicle. With a lower bin and high handles, this cart is unwieldy to tip sideways. The short centrally mounted grips limit the dumping torque that can be applied to the cart.

U.S. Pat. No. 5,070,687 of Schweigert, in one embodiment of a grass collecting apparatus, shows a fabric cover fitted over an array of removable insert containers in a tractor-attached bagger for collecting grass clippings. The fabric cover is manually moved with the help of a support frame to one end of the bagger attachment bin to gain access to the insert containers for emptying.

SUMMARY OF THE INVENTION

A stable cart or wheelbarrow can be easily filled with used straw and transported to a dumpster by a single groom. However, if the straw must be transferred to the dumpster in an efficient manner, the most time-saving and effective method would be to lift the cart or wheelbarrow over the edge of the dumpster to dump its entire contents in one motion. The alternative is to use a fork to transfer portions of the cart contents over the edge of the dumpster thereby almost surely spilling some in the vicinity. Since a stable cart or wheelbarrow is heavy and has a handle or handles on only one end of the bin for pushing, it is difficult for a second groom to help lift and dump the contents. The accessory handle of this invention attached to the bin opposite to the pushing handle facilitates the latter two-person operation in an ergonomic fashion. By equalizing the height of the front and rear handles, this adds to user safety, because it enables the two lifters to lift the wheelbarrow under equal lifting forces, thereby preventing one or both of the lifters from slipping and falling during the lifting process.

In the first embodiment the front handle assembly includes a centrally mounted wide handle with a cushioned grip that can swivel to a working position by simply pulling the cushioned portion out of a parked position against the cart bin. In a second embodiment, the front handle swivels on a bracket to a desired fixed working position and is then locked in place using a ratchet member and tightening knob. In a third embodiment, two separated fixed short front handles are attached to the cart or wheelbarrow bin instead of a centrally mounted wide handle.

In the stable cart or wheelbarrow of this invention, an easily removable fabric cover extends over the top of a bin or tub filled with used straw to trap the load within the confines of the vehicle. The cover panel is simply pulled out of a storage space along one side of bin, stretched over the load, and locked in place on the opposite side. To remove, the free end of the fabric is simply unlatched and rewound on a drum within the storage space. In one embodiment, this is done manually with a crank knob. In an alternate embodiment, the fabric is urged into the storage space by a spring in a similar fashion to that of a window shade. The fabric is preferably a light canvas, although other materials such as flexible plastic can be used.

BRIEF DESCRIPTION OF THE DRAWINGS

The present invention can best be understood in connection with the accompanying drawings. It is noted that the invention is not limited to the precise embodiments shown in drawings, in which.

DETAILED DESCRIPTION OF THE INVENTION

Figure 1:
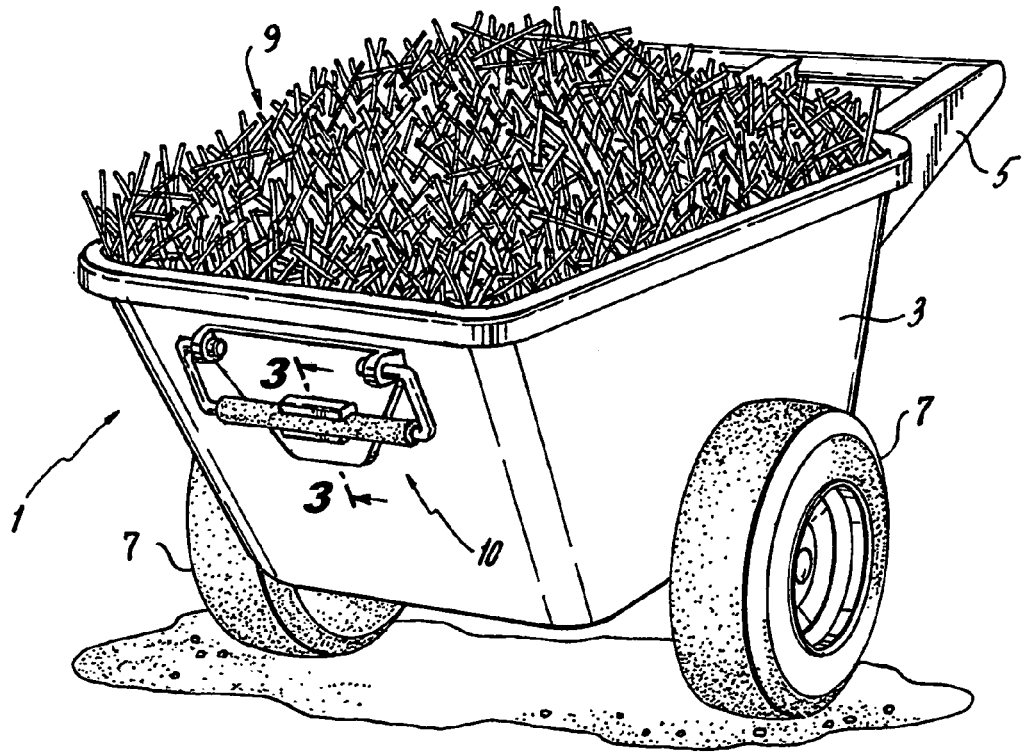
FIG. 1 is a perspective view of a two wheel stable cart with a swiveling front accessory handle for lifting and dumping.

Although either a single wheel wheelbarrow or a two wheel cart can be fitted with a front accessory handle, FIG. 1 depicts a two wheel cart 1 with molded handle 5, bin 3 and wheels 7. It is carrying a load of debris, such as straw 9. Other kinds of debris can be carried, such as garden compost. An accessory front handle assembly 10 is attached to the upper front surface of bin 3.

Figure 2:
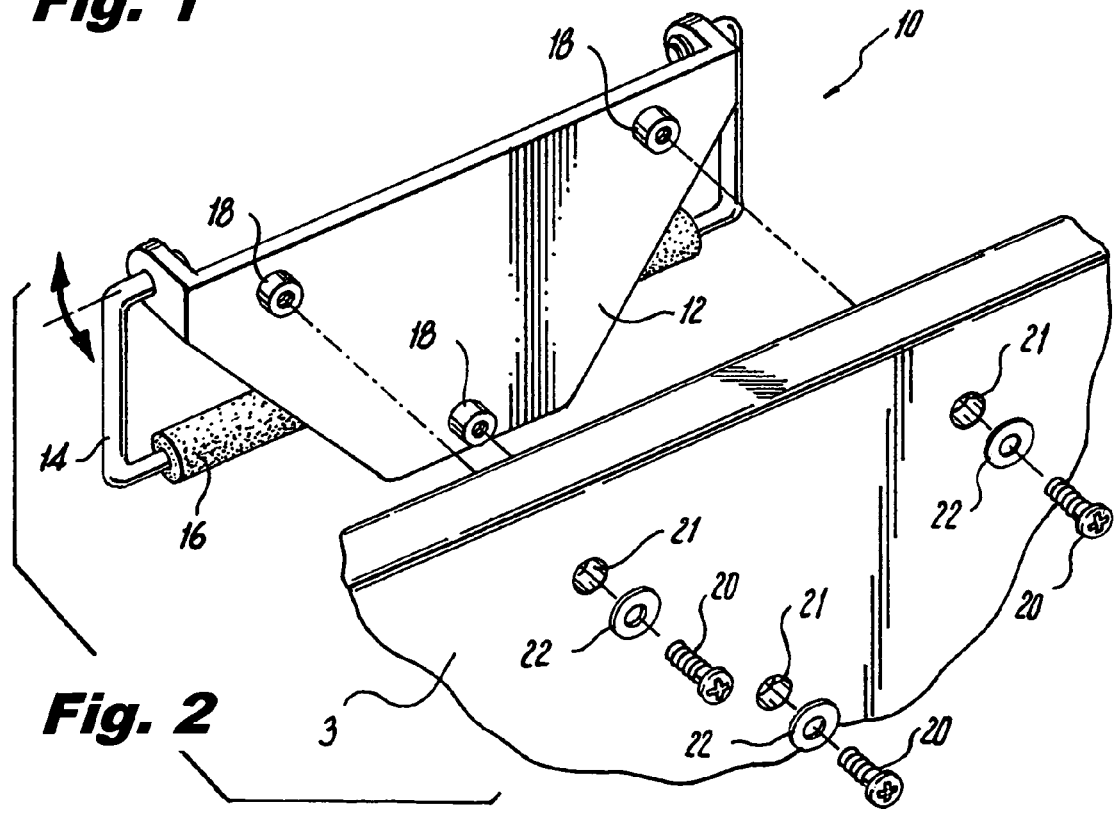
FIG. 2 is an enlarged perspective detail of the handle assembly shown in FIG. 1.
Figure 3:
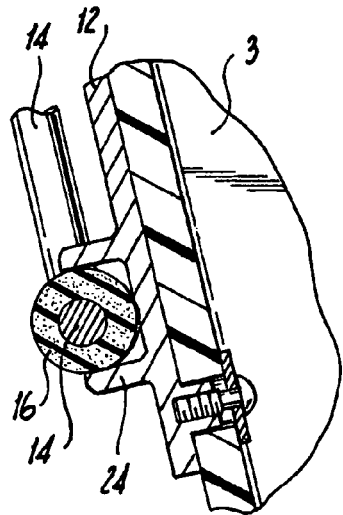
FIG. 3 sectional elevation detail of the handle assembly of FIG. 2.

FIG. 2 shows the parts of handle assembly 10 and the method of attachment. The crossection of FIG. 3 further describes handle 10 assembly. Attachment plate 12 holds the ends of handle 14 and has bosses 18 which fit inside holes 21 in bin 3 material. The attachment is completed with screws 20 and washers 22; screws 20 engage threaded blind holes in bosses 18. Handle 14 with resilient grip 16 is held against bin 3 end when not in use by friction with the inside surfaces of channel 24 which slightly deform grip material 16.

Figure 5:
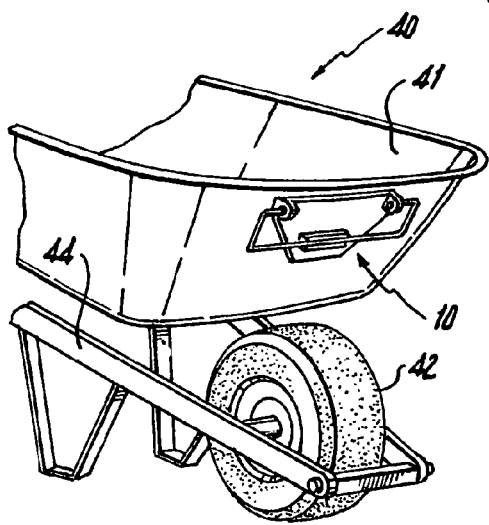
FIG. 5 is a perspective view of the handle assembly of FIG. 2 installed on the front of a curved tub wheelbarrow.

FIG. 5 shows handle assembly 10 attached to the end of wheelbarrow 40 with curved tub 41, frame 44 and single wheel 42.

Figure 4:
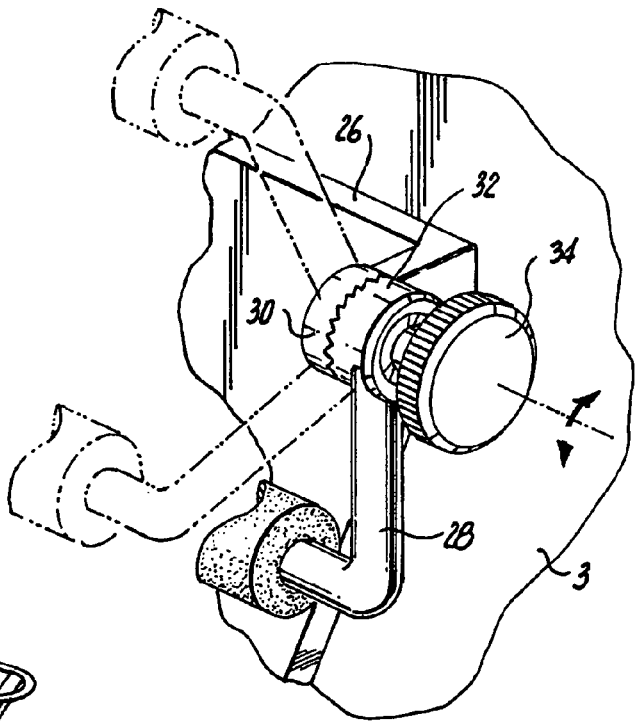
FIG. 4 is a perspective view of a second embodiment handle with a tilt ratchet to allow the handle to be selectively angled.

FIG. 4 shows the details of a second embodiment accessory front handle assembly. Frame 26 is rigidly attached to fixed ratchet member 30 while handle 28 is rigidly attached (as by welding, for example) to rotatable ratchet 32. Screw knob 34 forces the ratchet faces together to lock the position of handle 28 in any desired position as indicated by the two phantom views. This is ergonomically superior to handle 10 assembly as it affords rigidity to a handle 28 during the lifting and dumping procedure. The ratchet assembly 32 includes a fixed ratchet member 30 mounted on one of said forwardly extending members 28 of the bracket, a mating, rotatable ratchet member 32 attached to the corresponding end arm of the adjustable handle, and a screw knob 34 to separate the fixed and rotatable ratchet members 30,32 temporarily to allow the resilient grip 16 to be positioned at any one of multiple positions between the parked position and the fully deployed position, whereby the elongated resilient grip 16 is fixed in whatever position it is held by the matching and fully mated ratchet members 30,32.

Figure 6:
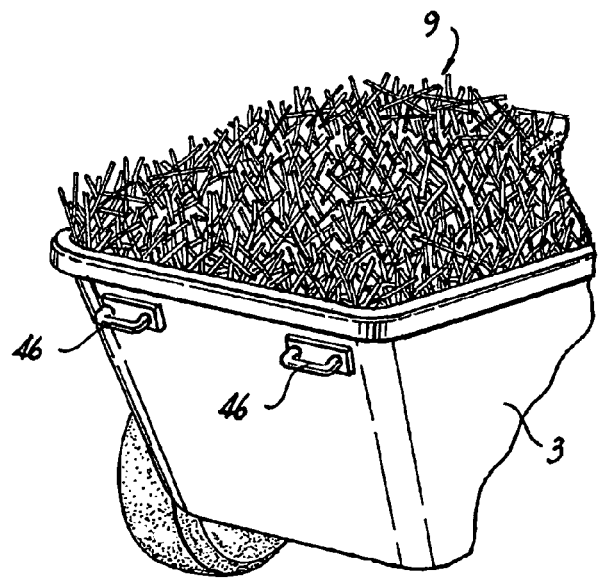
FIG. 6 is a perspective view showing a cart fitted with two separate front accessory handles comprising a third embodiment.

FIG. 6 shows the third embodiment of accessory handle in which two separate short handles 46 substitute for a single centrally located handle. The separation of handles 46 afford good torque transfer to bin 3 for dumping.

Figure 7:
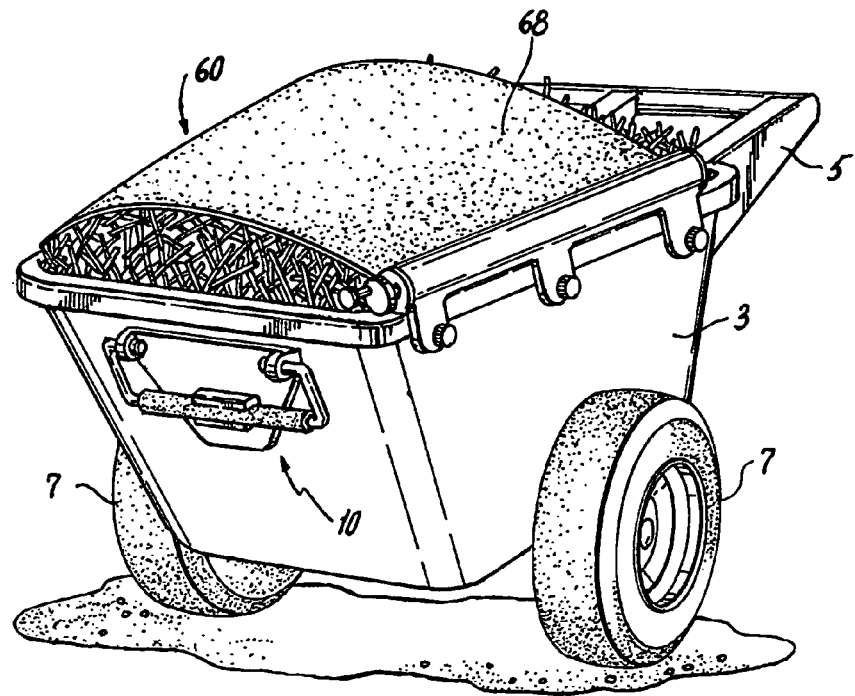
FIG. 7 is a perspective view of a stable cart full of used straw with the straw trapper accessory of this invention in place over the top of the bin.

FIG. 7 shows a stable cart with straw trapper accessory 60 attached and in use with fabric panel 68 deployed over the open top of the bin trapping straw 9 inside.

Figure 8:
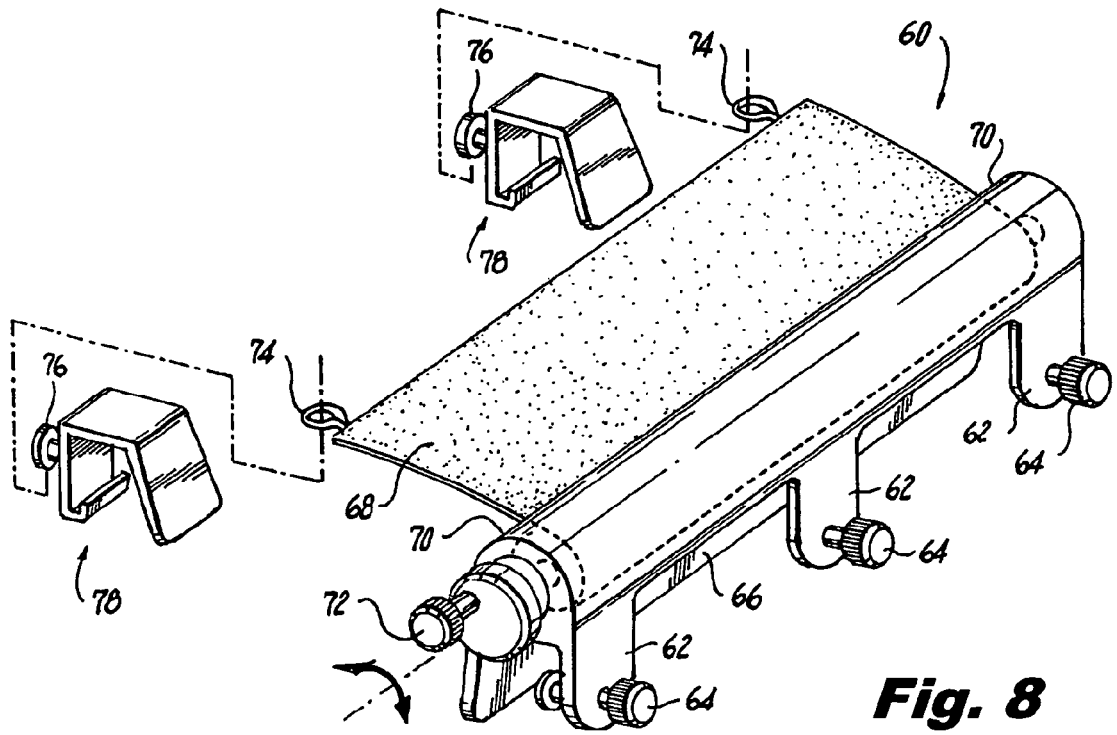
FIG. 8 is a perspective view of the straw trapper accessory not mounted on a cart.

FIG. 8 shows the parts of straw trapper 60 including storage chamber 70, backing plate 66, front clamp extensions 62, clamping knobs 64, rewind crank knob 72, fabric panel 68, locking loops 74, far edge retainers 78 and loop knobs 76. In the illustrated embodiment, knob 72 is used to rewind fabric panel 68 manually back into storage chamber 70, having a roller therein, to expose the bin interior. The spaced far edge retainers 78 are mounted on an outside surface of the second side wall. Each far edge retainer 78 has an extended loop knob 76 to engage the loops 74 mounted on the free edge of the fabric panel 68, whereby when the fabric panel 68 is pulled off of the roller and is extended over the open top of the bin 3, and the loops 74 are placed over the loop knobs 76, so that the fabric panel 68 remains in place to retain the straw 9 within the bin 3 while the bin 3 is stored or transported, so that the fabric panel 68 is rewound onto the roller when the loops 74 are released from the loop knobs 76 and the rewind crank knob 72 is rotated.

In an alternate embodiment (not shown) no rewind crank knob 72 is used since an internal spring rewinds fabric 68 when loops 74 are released from engagement with loop knobs 76.

Figure 9:
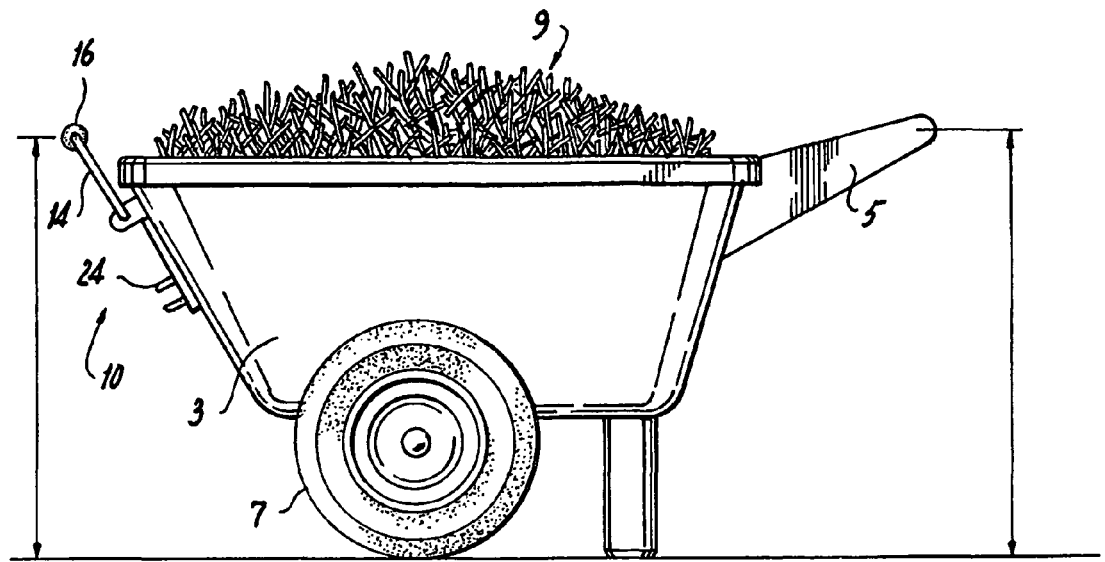
FIG. 9 is a side elevation of a stable cart showing the mounting of the straw trapper to the side of the bin.

FIG. 9 shows the side of the stable cart where the straw trapper accessory 60 is attached. Backing plate 66 (not visible) lies against the inside of bin 3 while clamp extensions 62 permit clamping to the outside surface of bin 3 under the top lip of bin 3. FIG. 9 also illustrates the equal height of the rear pushing handle 5 and the grip 16 of handle assembly 10 when handle is at deployed height. It is this equal height at the level close to the top of bin 3 that is most useful for lifting and dumping. This height also enables the users, such as two grooms at a racetrack, to have the respective handles 5 and 10 at equal chest height when the biceps are strongest at an ergonomic right angle, when tipping the contents 9 of the cart 1 into a dumpster 53. If the handles 5 and 10 were much higher than the top of the bin 3 of the cart, then the users would have to uncomfortably extend the users' arms over the users' respective head areas, so that the top of the bin 3 was at the height level of the top of the dumpster 53.

Figure 10:
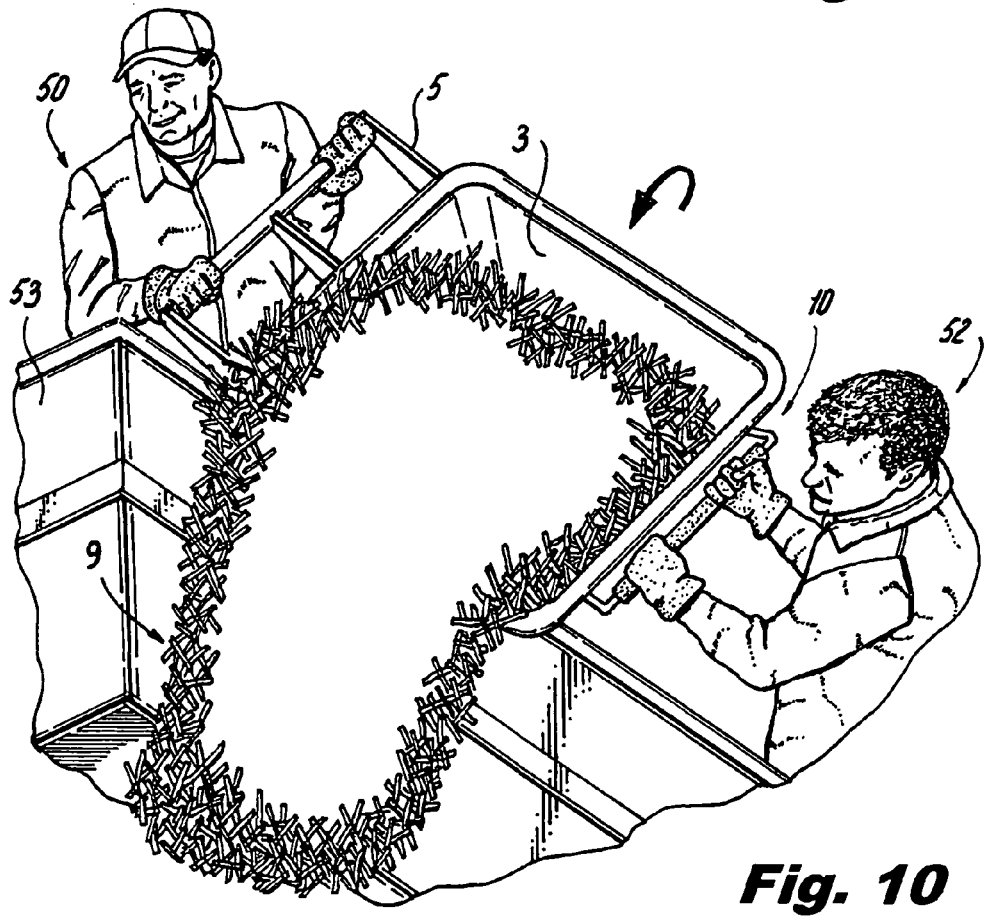
FIG. 10 is a perspective view of two grooms dumping a stable cart with straw trapper accessory attached and fabric panel in storage compartment.

FIG. 10 shows grooms 50 and 52 dumping the contents of bin 3 into dumpster 53; it is noted that fabric panel 68 has been wound up inside storage chamber 70 prior to this procedure.

In the foregoing description, certain terms and visual depictions are used to illustrate the preferred embodiment. However, no unnecessary limitations are to be construed by the terms used or illustrations depicted, beyond what is shown in the prior art, since the terms and illustrations are exemplary only, and are not meant to limit the scope of the present invention.

It is further known that other modifications may be made to the present invention, without departing the scope of the invention, as noted in the appended Claims.

We claim:

1. A dual handled liftable wheelbarrow for managing straw in a stable, comprising:
    a bin having a pair of front and rear upwardly and outwardly extending walls, a pair of side walls, and a closed bottom, said bin having an open top for receiving and discharging said straw;
    a wheel assembly engaged with a bottom of said bin for supporting and transporting said bin;
    a fixed handle mounted on an outside of said rear wall adjacent a top edge thereof for pushing said wheelbarrow on said wheel assembly;
    a deployable auxiliary handle mounted on a bracket mounted on an outside of said front wall movable between a stored position against said bracket and a deployed position extending away from said bracket, said bracket comprising a flat plate portion flush on and attached to said front wall, and having a pair of forwardly extending members at opposite side ends of said flat plate portion, said bracket being adjacent a top end or said front wall; and,
    a straw trapper for enclosing said straw in said bin for shipment and storage comprising a dispenser of a panel of fabric to cover said open top of said bin mounted on a first of said side walls, and means mounted on a second, opposite side wall for engaging a free end of said fabric panel;

said auxiliary handle when deployed having a height equal to that of said fixed handle, above the top opening of said bin, and at chest height that is most useful for lifting and dumping;

whereby said fixed and auxiliary handles mounted on rear and front walls, respectively, of said bin allow two users working together to unload straw from said bin over a side wall of said bin.

2. The dual handled liftable wheelbarrow for managing straw as in claim 1 wherein said auxiliary handle is an adjustable handle with an elongated resilient grip having end arms swiveling about and mounted on said forwardly extending members of said bracket, said handle being rotatable between a parked position flush downwardly against the outside of said front wall, and an upwardly extending deployed position with said resilient grip above the open top of said bin; and a channel mounted on said flat plate portion of said bracket to receive and retain by friction with inside surfaces of said channel said resilient grip of said handle when in the parked position, whereby said bin can be manipulated to receive and discharge straw with selective use of either or both of said fixed and adjustable handles.

3. The wheelbarrow of claim 1 in which said bracket is attached to said front wall by the use of bosses extending through said front wall and attached by screws to said front wall.

4. The wheelbarrow of claim 1 in which multiple fixed handles are mounted on said rear wall.

5. the wheelbarrow of claim 1 in which said dispenser comprises a backing plate mounted on the outside of said first side wall, a roller mounted for rotation on said backing plate, a fabric panel rolled onto said roller, and a crank at one end of said roller to wind up said fabric panel on said roller.

6. The wheelbarrow or claim 5 in which said fixed handle is molded.

7. The wheelbarrow of claim 6 having a ratchet assembly comprising a fixed ratchet member mounted on one of said forwardly extending members of said bracket, a mating, rotatable ratchet member attached to the corresponding end arm of said adjustable handle, and a screw knob to separate said fixed and rotatable ratchet members temporarily to allow said resilient grip to be positioned at any one of multiple positions between the parked position and the fully deployed position, whereby the elongated resilient grip is fixed in whatever position it is held by said matching and fully mated ratchet members.

8. The wheelbarrow of claim 5 in which said engaging means comprises spaced far edge retainers mounted on an outside surface of said second side wall, each far edge retainer having an extended loop knob to engage loops mounted on the free edge of said fabric panel, whereby when said fabric panel is pulled off said roller and extended over said open top of said bin, and said loops are placed over said loop knobs, said fabric panel remains in place to retain said straw within said bin while said bin is stored or transported, said fabric panel being rewound onto said roller when said loops are released from said loop knobs and said rewind crank is rotated.

9. The auxiliary removable attachment handle as in claim 5 wherein
said height of said front and rear handles enabling two respect lifting users to have said respective front and rear handles at equal chest height when tipping the contents of said wheelbarrow cart into a dumpster.

10. A dual handled liftable wheelbarrow for managing straw in a stable, comprising:
a bin having a pair of front and rear upwardly and outwardly extending walls, a pair of side walls, and a closed bottom, said bin having an open top for receiving and discharging said straw;
a wheel assembly engaged with a bottom of said bin for supporting and transporting said bin;
a fixed handle mounted on an outside of said rear wall adjacent a top edge thereof;
an auxiliary handle mounted on a bracket mounted on an outside of said front wall, said bracket comprising a flat plate portion flush on and attached to said front wall, and having a pair of forwardly extending members at opposite side ends of said flat plate portion, said bracket being adjacent a top end of said front wall; and,
a straw trapper for enclosing said straw in said bin for shipment and storage comprising a dispenser of a panel of fabric to cover said open top of said bin mounted on a first of said side walls, said dispenser comprises a backing plate mounted on the outside of said first side wall, a roller mounted for rotation on said backing plate, a fabric panel rolled onto said roller, and a crank at one end of said roller to wind up said fabric panel on said roller; and means mounted on a second, opposite side wall for engaging a free end of said fabric panel, said engaging means comprising spaced far edge retainers mounted on an outside surface of said second side wall, each far edge retainer having an extended loop knob to engage loops mounted on the free edge of said fabric panel and comprises a first leg attached to an outside surface of said second side wall, an outwardly extending portion, a downwardly extending second leg spaced from said first leg, and said loop knob extending outwardly from said first leg, whereby when said fabric panel is pulled off said roller and extended over said open top of said bin, and said loops are placed over said loop knobs, said fabric panel remains in place to retain said straw within said bin while said bin is stored or transported, said fabric panel being rewound onto said roller when said loops are released from said loop knobs and said rewind crank is rotated;
whereby said fixed and auxiliary handles mounted on rear and frond walls, respectively, of said bin allow two users working together to unload straw from said bin over a side wall of said bin.

11. A dual handled liftable wheelbarrow for managing straw in a stable as in claim 1 wherein said straw trapper for enclosing said straw in said bin for shipment and storage further comprises said dispenser comprising a backing plate mounted on the outside of said first side wall, a roller mounted for rotation on said backing plate, a fabric panel rolled onto said roller, and a crank at one end of said roller to wind up said fabric panel on said roller; said engaging means comprising spaced far edge connectors mounted on an outside surface of said second side wall, each far edge connector engaging a further connector mounted on the free edge of said fabric panel, whereby when said fabric panel is pulled off said roller and extended over said open top of said bin, and said connectors connect to said further connectors said fabric panel remains in place to retain said straw within said bin while said bin is stored or transported, said fabric panel being rewound onto said roller when said loops are released from said loop knobs and said rewind crank is rotated.

* * * * *